United States Patent [19]

Anderson et al.

[11] Patent Number: 5,121,948
[45] Date of Patent: Jun. 16, 1992

[54] DRYER DUCT AND VENT ASSEMBLY INCLUDING A FLEXIBLE DUCT PORTIONS

[75] Inventors: Charles B. Anderson, Jacksonville, Tex.; Charles R. Kenrick, Spring Lake, Mich.

[73] Assignee: Builder's Pride, Inc., Fort Worth, Tex.

[21] Appl. No.: 621,757

[22] Filed: Dec. 4, 1990

[51] Int. Cl.⁵ .................... F16L 27/00; F24F 13/00
[52] U.S. Cl. ............................. 285/168; 285/169; 285/181; 285/183; 285/278; 285/903; 285/165; 285/226; 34/235; 454/903
[58] Field of Search ............... 285/168, 181, 183, 278, 285/903, 252, 253, 165, 169, 226; 34/235; 98/DIG. 7; 138/121

[56] References Cited

U.S. PATENT DOCUMENTS

| 1,845,882 | 12/1930 | Litschge | 285/253 |
| 2,511,335 | 6/1950 | Guarnaschelli | 285/169 |
| 2,707,117 | 4/1955 | Fentress et al. | 285/226 |
| 2,823,703 | 7/1955 | Nusser, Jr. | 285/181 |
| 2,936,185 | 3/1956 | Olsen et al. | 285/226 |
| 3,731,711 | 5/1973 | Bauer | 138/121 |
| 4,081,915 | 4/1978 | Materniak | 34/325 |

Primary Examiner—Randolph A. Reese
Assistant Examiner—Timothy Aberle
Attorney, Agent, or Firm—Price, Heneveld, Cooper, DeWitt & Litton

[57] ABSTRACT

Disclosed is a metal dryer exhaust duct assembly using a pair of flexible corrugated metal ducts capable of linear extension and capable of reorientation of the duct ends, a pair of elbow connectors, one for attachment to a dryer exhaust outlet and the other for attachment to a wall inlet. Each duct has a swivel connection to its respective elbow connector, using a sleeve which interfits with the elbow connector by a peripheral projection and recess arrangement. Each duct can also be interfit with another such duct. The two ducts can be attached respectively to an dryer and a wall spaced from each other, and are vertically self supporting, whereby when the dryer is moved adjacent the wall, a person can readily telescopically interconnect the ends of the ducts over the top of the dryer. One or more pieces of the duct may be used to span the distance between the dryer and the wall outlet.

7 Claims, 4 Drawing Sheets

DRYER DUCT AND VENT ASSEMBLY INCLUDING A FLEXIBLE DUCT PORTIONS

RELATED APPLICATIONS

This application is related to the copending applications Ser. No. 621,774, filed Dec. 4, 1990, entitled UNIVERSAL DRYER DUCT AND VENT Ser. No. 621,756, filed Dec. 4, 1990, entitled UNIVERSAL DUCT ELBOW AND CONNECTOR PLATE, and Ser. No. 621,775, filed Dec. 4, 1990, entitled SOFT CUFF CORRUGATED DUCT.

BACKGROUND OF THE INVENTION

This invention relates to exhaust vent systems for clothes dryers.

Dryer exhaust conduits conduct substantial quantities of heated air and lint from the dryer to an external location Because of the amount of thermal energy involved in the vented air and in the dryer itself, dryer hose installation should be carefully made by a skilled serviceman. A kinked or crushed conduit could create highly undesirable air flow restriction causing reduced velocity resulting in lint buildup in locations of reduced velocity This lint buildup constitutes combustible material in the event of a fire in the dryer.

Underwriters Laboratory, being well aware of these problems, will not allow the UL listing for any dryer unless the manufacturer uses all metal connections and conduit in the vent system in order to contain any fire within the dryer and vent system. Unfortunately, the persons that frequently install dryers are delivery people hired by retailers to drive truck and unload equipment. They too often are without the metal working skills required to make an effective dryer exhaust hookup of metal components. Therefore, such delivery people largely refuse and/or are simply unable to use metal duct and connectors as required by UL, because such are too complex for their skill level. Yet, they are commonly required by their employers to install the dryer vent system. Consequently, they use whatever materials are easy to manipulate, usually accordion type vinyl duct, and connect them any way they can. The results are far from ideal. Vinyl duct tends to collect lint along its length if kinked. Moreover, vinyl duct is not noncombustible Hence, if a fire should occur in the dryer, it cannot be contained by the vent hose. The Consumer Products Safety Commission reported that in 1987, 13,900 clothes dryer fires occurred in the U.S.

Another difficulty in installing clothes dryer vent systems is the limited space available to do the work. Dryers typically are fitted into a space just wide enough to receive them, i.e., straddled by walls, a washing machine, a cabinet, or shelving. Typically, therefore, it is practically impossible to make the vent connection after the dryer is against the wall. By making the connection when the dryer is still spaced several feet from the wall too often results in not being able to get the dryer close to the wall after the installation or, if it is pushed close to the wall, the hose sometimes gets crushed, kinked and/or flattened, resulting in poor air flow.

Dryer manufacturers are therefore concerned about poor dryer performance from an improper installation, as well as about potential legal liability in the event of overheating caused by a poor vent arrangement, and failure of the dryer safety controls to shut down the dryer before ignition temperature is achieved. The manufacturer can supply metal connector and duct material to the retailer with the dryer and stipulate that only metal duct components are to be used, but when the delivery person takes the dryer from the retailer to the purchaser, the manufacturer has no effective way of forcing him to install the dryer conduit using metal ducts and connectors.

The problem has been further compounded in recent years due to a tendency to place dryers in small closets. Typically such a closet will have a maximum of about 33 inches clearance. There is little or no room to make the vent hookup unless the dryer is outside of the closet at the time. Then, when it is pushed into the closet, several things, some bad, can happen to the dryer hose and connection.

Hence, in spite of the initial efficiency of the dryer as manufactured, and the theoretical connection to a freely flowing exhaust, in practice dryers may well not achieve this type of efficiency, and moreover the dryer and/or the vent duct are susceptible to overheating because of inadequate air flow through the vent system, failure of safety circuits, and collection of combustible lint.

SUMMARY OF THE INVENTION

An object of this invention is to provide a dryer ventilation duct system that enables a workman to complete the duct hookup simply by leaning over the dryer after it is adjacent the wall and sliding a pair of components together. The system enables the dryer to be positioned closely adjacent the wall, e.g., three or four inches therefrom, yet without the duct being kinked, squashed or crushed. Tests have shown excellent air flow with the arrangement.

Another object of the invention is to provide a dryer ventilation system using all metal duct and connectors, so as to meet UL listing requirements of the dryer, yet being simple and readily connected with relatively little skill required. Delivery people with low levels of skill can connect it quickly and easily, achieving excellent flow characteristics and safe operation.

Another object of this invention is to provide a dryer ventilation system capable of enabling the dryer to be positioned directly adjacent and in front of the outlet opening in the wall where the hot air is vented, or just as readily to be several feet laterally of the wall outlet, using the same duct arrangement and connectors. The metal duct can be looped for the first type arrangement, or extended laterally for the second type arrangement. Connection is just as simple in either instance.

The vent system employs a pair of special duct and connector subassemblies, one of which is readily attachable to the dryer exhaust outlet and the other of which is readily attachable to the wall outlet opening. At least one of these attachment functions, and optionally both, can be done while the dryer is far from the wall. The two subassemblies have corrugated metal duct elements which are self supporting so as to stand vertically, yet are flexible to be interconnected after the dryer is moved adjacent the wall. The upper ends of the vertical duct elements can be grasped by a person leaning over the dryer, oriented toward each other and slidably interconnected. Alternatively, the two ends can be turned to a lateral orientation prior to the dryer being placed adjacent the wall so that when the dryer is moved adjacent the wall, the ducts can be directly interconnected.

These and other objects, advantages and features of the invention will become apparent from the following detailed description in conjunction with the drawings.

DESCRIPTION OF THE PREFERRED EMBODIMENT

Referring now specifically to FIGS. 1-11, the dryer and dryer exhaust duct assembly 10 depicted (FIG. 1) show a conventional dryer 12 and the novel dryer duct assembly 14 in accordance with this invention. Typically, a dryer 12 will have a cylindrical hot air outlet on the back side, often in the lower half of its back wall. Further, such an outlet typically includes a tubular extension, cylindrical in configuration to define a circular outlet, and having an external surface over which the dryer duct is slid in telescopic fashion, such duct normally being secured to the extension as by a hose clamp of conventional type. In addition, the outlet pipe 16, normally an exhaust pipe or a vent hood tail pipe, in a wall through which the exhaust gases are to be vented typically is cylindrical and may have a shoulder 16' (FIG. 3) extending into the room behind the dryer. In a normal situation, the outlet end of the flexible exhaust hose or duct will be slid telescopically over this shoulder 16' and secured with a suitable hose clamp. As has been explained earlier, achieving this connection between the back of the dryer and the outlet in the wall is not readily done and often is not even possible after the dryer is adjacent the wall. Rather, the hookup must be made when the dryer is spaced several feet from the wall, the dryer then being pushed back to the wall with the duct moving to wherever it may go under such circumstances, hopefully not to be kinked, crushed or damaged in too great a fashion.

In the assembly depicted, the duct is composed of two portions 14a and 14b, each of these comprising a subassembly. Duct portion 14a is adapted to be connected to the outlet of the dryer. Duct portion 14b is adapted to be connected to the discharge opening in the wall. Duct portions 14a and 14b are also adapted to be readily interconnectable with each other.

Figures 1, 2:
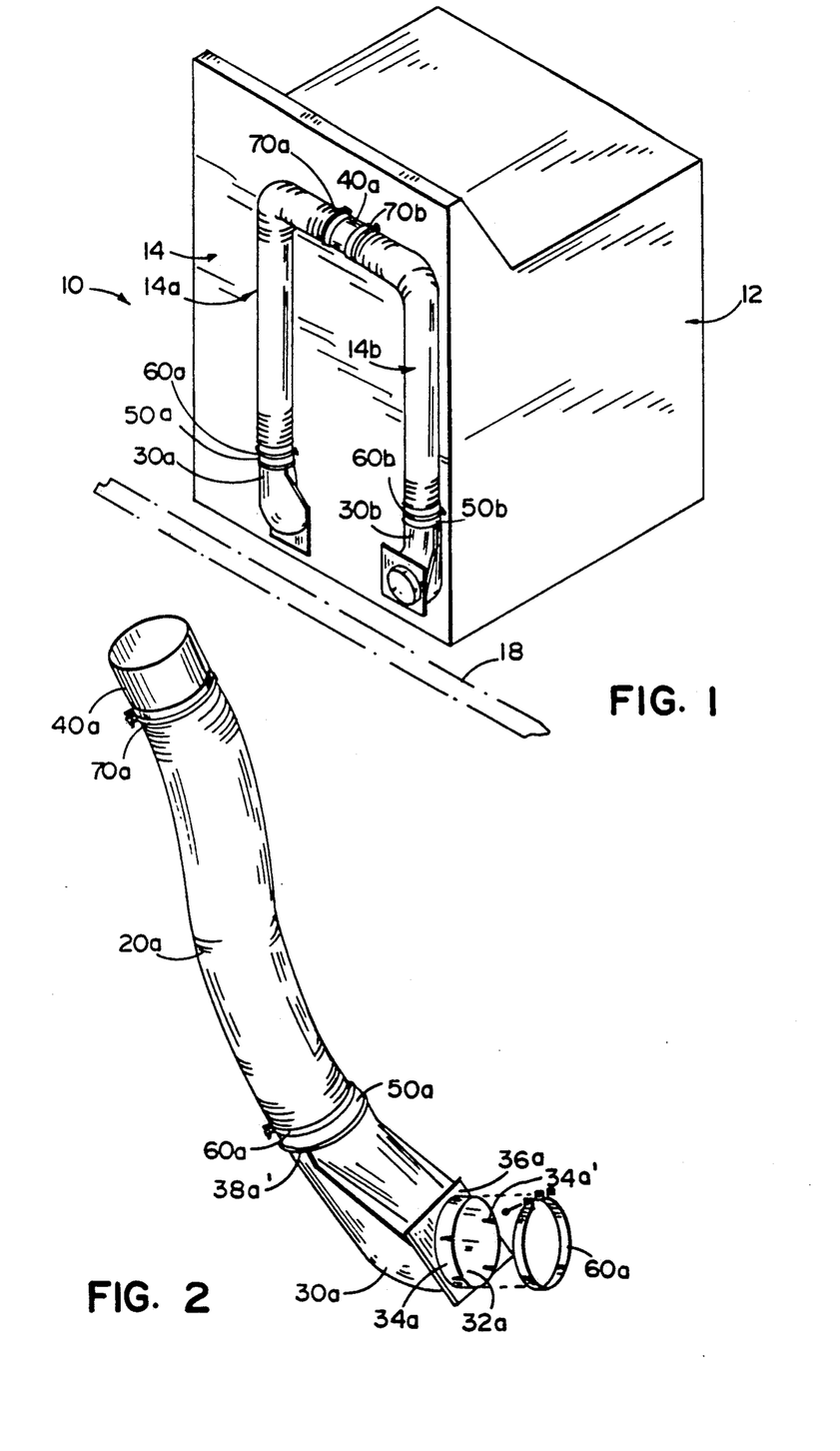
FIG. 1 is a perspective view of the first embodiment of he novel dryer duct assembly incorporating this invention and shown at the rear of a dryer.
FIG. 2 is a perspective view of one portion of the dryer duct assembly in FIG. 1, particularly depicting the portion that attaches to the dryer exhaust air outlet.
Figures 3, 4, 5:
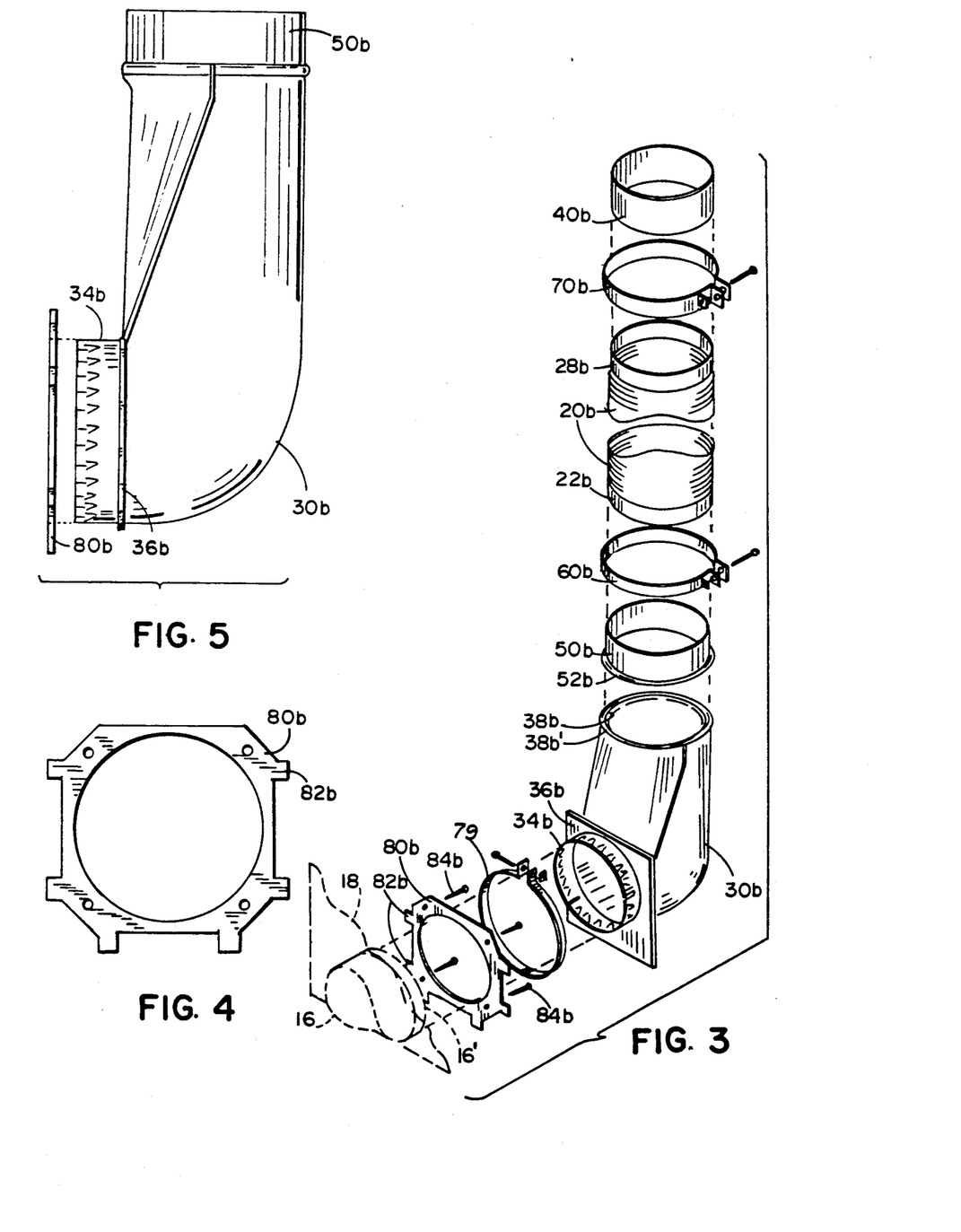
FIG. 3 is an exploded, perspective view of the other duct portion of the assembly in FIG. 1, attachable to an outlet in a wall through which the exhaust air flows.
FIG. 4 is an elevational view of the connector plate forming part of the subassembly in FIG. 3.
FIG. 5 is an exploded view of the connector plate in FIG. 4 plus an elbow connector forming part of the subassembly in FIG. 3.
Figures 6, 7:
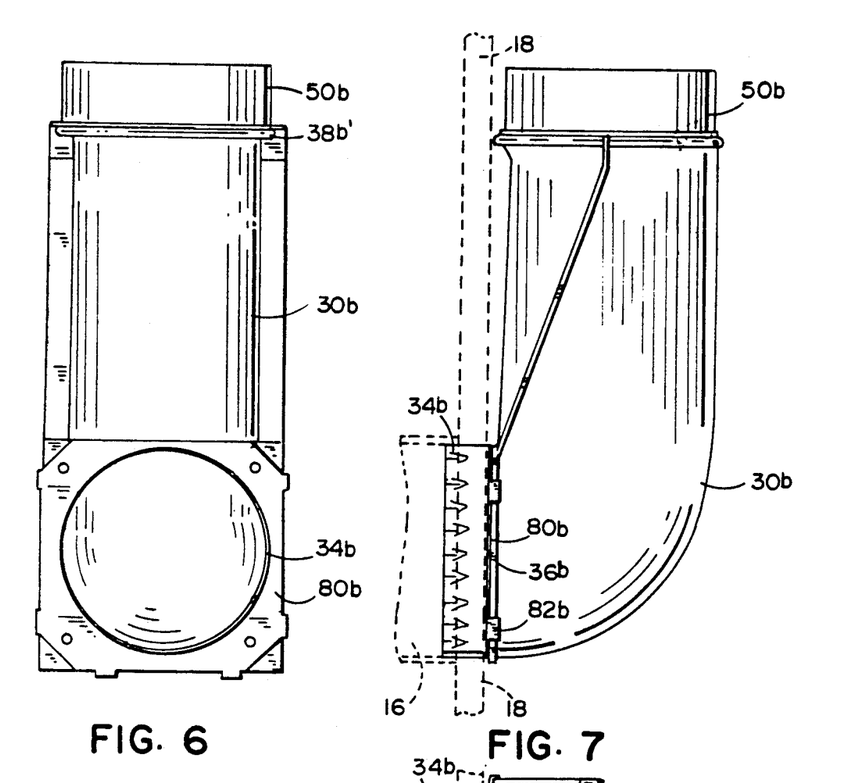
FIG. 6 is an end elevational view of the subassembly in FIG. 5, from the left side.
FIG. 7 is a side elevational view of the components in FIG. 5 attached to a wall panel.
Figure 8:
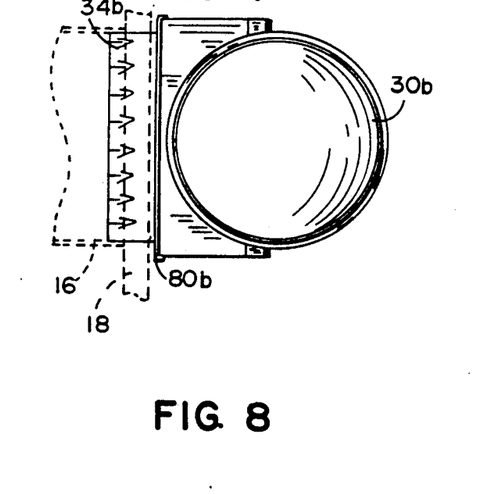
FIG. 8 is a top plan view of the components in FIG. 7.
Figure 9:
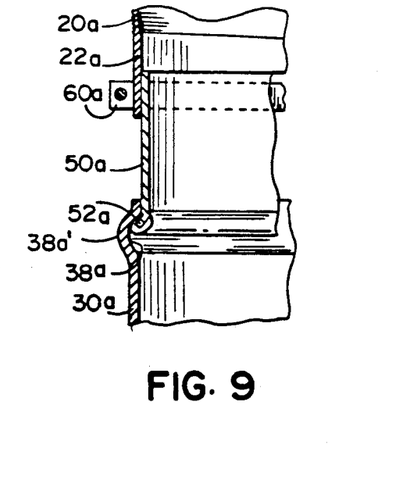
FIG. 9 is a fragmentary, enlarged, sectional view showing the swivel connection between the elbow connector in FIG. 3 and the duct attached thereto.

More specifically, duct portion 14a comprises a corrugated flexible metal duct element 20a (see FIGS. 1, 2 and 10), usually of aluminum and corrugated in conventional fashion to be laterally flexible and axially extensible. It has first and second ends. The first end is attached to a first elbow connector 30a. The second end has a telescopic interfit sleeve 40a (see FIGS. 2 and 10). Elbow connector 30a has a first opening 32a circular in shape and defined by a surrounding peripheral cylindrical shoulder 34a having longitudinal slots 34'a for contraction of the shoulder when clamped by a conventional surrounding circular clamp 60a (FIG. 2). Adjacent shoulder 34a is a planar abutment panel 36a around the periphery of shoulder 34a and transverse to the axis of the opening. At the other end of elbow connector 30a is a swivel connection. Conceivably, a swivel connection could be made at both ends of the elbow. It includes an annular recess 38a on elbow connector 30a, defined by an annular integral U-shaped shoulder 38'a (FIG. 9). The elbow connector here depicted is a reducer to connect a slightly larger dryer outlet, e.g., four inches in diameter, to a smaller hose diameter, e.g., three inches. It should be realized, however, that the hose and corresponding end of the elbow connector could both be four inches or both be three inches, or any other suitable size.

Fitted within recess 38a is an annular, radially outwardly extending rib or projection 52a on a cylindrical sleeve 50a of metal, e.g., aluminum. Hence, sleeve 50a can be rotated relative to the elbow connector by the swivel joint so formed, a significant feature to enable the duct subassemblies to be readily interfitted with the dryer outlet, the wall opening and each other, regardless of the location and orientation of the dryer outlet and wall opening. On the second end of sleeve 50a is telescopically interfitted a cylindrical end 22a of duct 20a. The duct end is slid over the sleeve and held in position by a conventional circular clamp 60a (FIGS. 1, 2 and 9). The opposite end of duct 20a is slid over the end of metal cylindrical sleeve 40a, the duct being held on sleeve 40a by a conventional circular clamp 70a.

Subassembly 20b is very similar to subassembly 20a, except for a difference in the manner in which elbow connector 30b is attached to the wall, and a small difference in the diameter of sleeve 40b to enable sleeves 40a and 40b to be telescopically interconnected.

More specifically, elbow connector 30b has an outlet at one end defined by cylindrical shoulder 34b. Transverse to the axis of the opening and around shoulder 34b is planar panel 36b. Connection of elbow connector 30b to the wall opening is preferably made by the following means. 1) If the tailpipe of the dryer vent hood or some other pipe 16' protrudes through the wall, a longitudinal slit may be made in pipe 16' and the collar 34b placed inside pipe 16' and held in place by using clamp 70b. 2) If the clearance is critical, pipe 16' may be cut off one-fourth to one-half inch from the wall surface and the remainder slit longitudinally every one-half inch or so to form a series of tabs which can be bent back to secure plate 80b against the wall after it is in place. 3) If pipe 16' does not protrude through the wall, plate 80b may be secured to the wall over the opening with fasteners 84b. Then collar 34b can be inserted into the pipe in the wall and tabs 82b bent over annular plate 36b to secure connector 30b to the wall. A plurality of fasteners such as screws 84b can be extended through openings formed in plate 80b to attach it to the wall 18 at the opening of outlet 16. Thus, attachment of elbow connector 30b to the wall is simple, requiring only the bending of tabs 52b and the insertion of screws 84b.

At the second end of elbow connector 30b is a circular opening defined by annular shoulder 38'b. Shoulder 38'b has a U-shaped edge defining a peripheral recess 38b. This recess receives the outwardly extending rib or projection 52b of metal sleeve 50b. Flexible metal corrugated duct 20b has a cylindrical end 22b which slidably fits over the periphery of sleeve 50b, being clamped thereon by a conventional circular clamp 60b. At the opposite end of duct 20b is a cylindrical portion 28b (FIG. 3) which receives sleeve 40b. This end of the duct is secured around sleeve 40b by a conventional circular clamp 70b.

Sleeve 40b has an external diameter matching the internal diameter of sleeve 40a or vice versa, these two components being telescopically slidably interfittable to form a tight connection. If desired, portions of the inner sleeve can be punched outwardly at an angle, and/or portions of the outer sleeve punched inwardly at an angle, in the form of tabs, to assure a tight fit when the tabs are depressed with telescopic interfitting of the sleeves.

To utilize the invention, therefore, each of the two subassemblies is preferably first assembled at the factory. More specifically, subassembly 14a is prepared by interfitting rib 52a of sleeve 50a into recess 38a of elbow connector 30a (FIG. 9), sliding the cylindrical portion 22a of corrugated metal duct 20a over sleeve 50a and attaching clamp 60a. Also, the opposite end of duct 20a is slid over one end of sleeve 40a and clamp 70a attached to secure this fit.

At the site of installation, this subassembly 14a is secured on the cylindrical outlet of the dryer discharge tube by sliding shoulder 34a onto the outlet and tightening clamp 60a around the exterior of shoulder 34a. When the clamp is tight, this subassembly 14a is self supporting, even if standing vertically.

Figure 10:
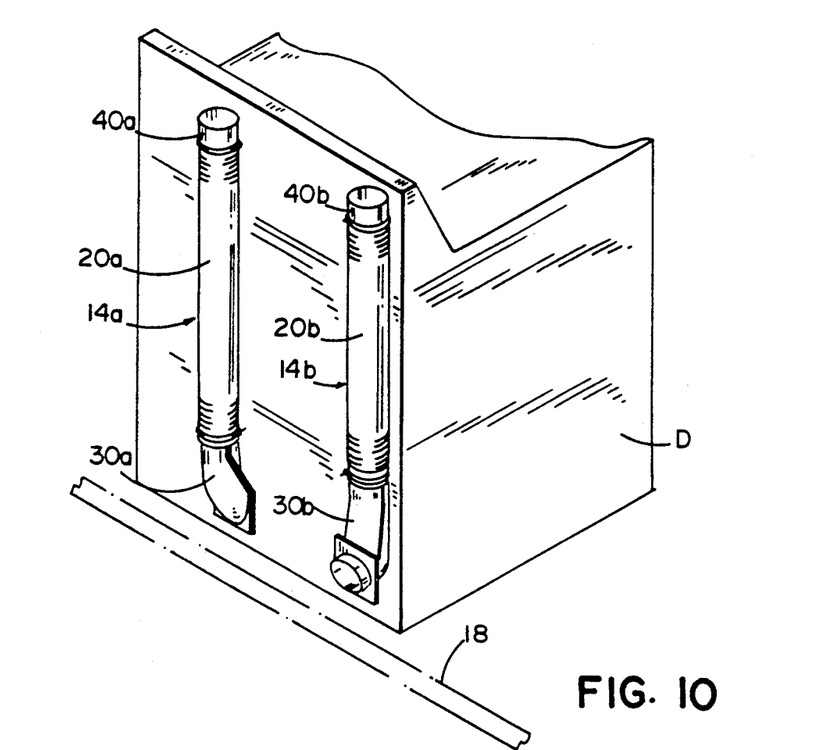
FIG. 10 is a perspective elevational view of the two dryer duct portions, one attached to the wall and the other attached to the dryer, after the dryer has been moved adjacent to the wall and prior to the connection being made as depicted in FIG. 1.

Subassembly 14b is also preferably assembled at the factory in a manner comparable to that explained above relative to subassembly 14a. Sleeve 50b is attached to elbow connector 30b to make the swivel connection by inserting shoulder 52b into recess 38b. The cylindrical end 22b of corrugated metal conduit 20b is slid over sleeve 50b and clamp 60b attached therearound to secure these together. At the opposite end of duct 20b, its cylindrical end 28b is placed over one end of sleeve 40b and secured thereto by clamp 70b. At the site, either of two alternative connections can be made to the extending portion 16' of pipe 16 in wall 18. Specifically, the connection can be made using the connector plate 80b (shown in FIG. 3 in phantom and in FIGS. 6 and 7 in solid lines). Annular shoulder 34b is a male end of elbow connector 30b. It is inserted into portion 16' of pipe 16 until elbow panel 36b fits flush against wall 18. Portion 16' is longitudinally slit. If clamp 79 is used, it is tightened around portion 16' to secure it to end 34b. If plate 80b is used, it is first placed over portion 16' and fastened to wall 18 with screws 84b. Then end 34b is telescopically interfit with portion 16', and tabs 82b are bent over panel 36b to secure the two together. This self supporting unit is then left in the desired orientation, e.g., standing vertically as depicted. The installer next shifts the dryer so that the two vertically oriented subassemblies are basically as shown in FIG. 10. To interconnect the two partial duct elements, the installer simply leans over the dryer, orients the upper ends of ducts 20a and 20b, and specifically sleeves 40a and 40b, toward each other, and slides these sleeves together telescopically to complete the connection. Alternatively, the upper end of the ducts can be reoriented prior to the dryer being slid adjacent the wall so that, after the dryer is placed adjacent the wall, the installer only need reach over the dryer and slide the two sleeves together telescopically The duct is torsionally rigid. The swivel prevents kinking of the duct and permits the dryer to be moved without disassembly of the duct assembly, yet without twisting the fittings and causing stress that could damage the elbows or attaching hardware.

In summary, if the two subassemblies have been previously assembled, all the installer has to do is clamp unit 14a to the dryer, attach unit 14b to the wall, and telescopically connect sleeves 40a and 40b. This is so simple that installation requires no tools except a screw driver, and no special skills. Persons can be taught in just minutes how to make the connection.

Figure 11:
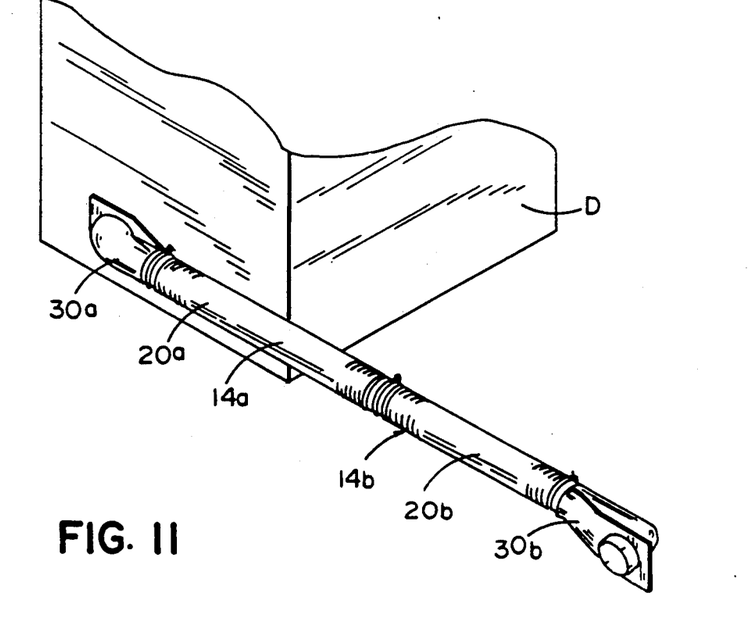
FIG. 11 is a fragmentary perspective view of the duct components of this assembly shown in an alternate outlet arrangement.

If the dryer is to be placed in a location which is substantially laterally offset from the dryer outlet, the arrangement in FIG. 11 may be employed. The same subassembly components 14a and 14b previously described are employed, except that when the attachment is made to the dryer, elbow connector 30a is oriented generally horizontally, as is duct 20a. The connection to the wall is also made in the same fashion, except that elbow 30b is oriented generally horizontally as is duct 20b. Then the two extensible flexible ducts are extended sufficiently to telescopically interconnect sleeves 40a and 40b in the fashion depicted in FIG. 11.

Manufacture of the apparatus is straightforward and can be automated. The unit can be readily installed by one of little skill, and, in fact, no skill in the metal working field, to produce a safe arrangement.

It will be noted that the collars or sleeves, e.g., 40a and 40b, can interconnect to each other, to a dryer, to a wall outlet, to the ducts, and to other standard sheet metal components. Further, the assemblage of components in the duct system is displaceable without disassembly thereof, to accommodate the particular dryer to wall positions, or movement of the dryer.

Conceivably, various details of this invention, as illustrated in the preferred embodiment, may be modified to suit a particular type of installation. Hence, the invention is not intended to be limited to the specific embodiment set forth as illustrative, but only by the scope of the appended claims and the reasonably equivalent structures to those defined therein The embodiments of the invention in which an exclusive property or privilege is claimed are defined as follows:

1. A metal dryer exhaust duct assembly comprising:
   first and second elbow connectors, each comprising a first sleeve defining a first opening to fit with a dryer discharge pipe and a wall outlet opening respectively, and a second sleeve defining a second opening for attachment to a flexible duct;
   a first flexible metal duct having one end attached to said second sleeve of said first connector;

a second flexible metal duct having one end attached to said second sleeve of said second connector;

said flexible ducts being of thin corrugated metal having a self supporting characteristic capable of linear extension and capable of lateral reorientation to orient said duct second ends in desired directions;

said first and second ducts both having second ends telescopically interfittable with each other to complete a flow path through the ducts.

The embodiments of the invention in which an exclusive property or privilege is claimed are defined as follows.

2. The dryer exhaust duct assembly in claim 1 wherein each said connector has a swivel connection to its respective flexible duct.

3. The dryer exhaust duct assembly in claim 2 wherein each said swivel connection comprises a sleeve telescopically interfitted with said duct and with said elbow connector, one of said sleeve and said elbow connector having a peripheral protrusion and the other of said sleeve and said elbow connector having a peripheral recess receiving said protrusion to form said swivel connection.

4. The dryer exhaust duct assembly in claim 1 wherein said second ends of said ducts comprise sleeves respectively attached to and extending said ducts.

5. The dryer exhaust duct assembly in claim 3 wherein each said sleeve telescopically interfitted with said elbow connector is also telescopically interfitted with said duct.

6. A ventilation assembly for attachment between a dryer outlet pipe and a wall outlet comprising:

flexible metal conduits having a first end and a second end;

said conduit ends being connectable to elbow connectors;

first and second elbow connectors;

said first elbow connector having two ends, a cylindrical swivel sleeve at least one of said ends attached to one of said conduits, and attachment means at the second of said ends for attachment to a dryer outlet;

said second elbow connector having two ends, a cylindrical swivel sleeve at least one of said ends attached to said conduit, and attachment means at the second of said ends for attachment to a wall opening.

7. The ventilation assembly in claim 6 wherein each said swivel connection comprises a sleeve telescopically interfitted with said duct and with said elbow connector, and one of said sleeve and said elbow connector having a peripheral projection and the other of said sleeve and said elbow connector having a peripheral recess receiving said peripheral projection to form said swivel connection.

* * * * *

UNITED STATES PATENT AND TRADEMARK OFFICE
CERTIFICATE OF CORRECTION

PATENT NO. : 5,121,948

DATED : June 16, 1992

INVENTOR(S) : Charles B. Anderson and Charles R. Kenrick

It is certified that error appears in the above-identified patent and that said Letters Patent is hereby corrected as shown below:

On the title page, item [54] and column 1, line 3;
    After "INCLUDING" delete -- A --;

On the title page, in the Abstract, line 11;
    "to an" should be -- to a --;

Column 1, line 19;
    After "location" insert -- . --;

Column 1, line 25;
    After "velocity" insert -- . --;

Column 1, line 45;
    After "noncombustible" insert -- . --;

Column 3, line 7;
    "he novel" should be -- the novel --;

Column 6, line 14;
    After "telescopically" insert -- . --;

Column 7, lines 11-13;
    Delete "the embodiments ... as follows. --;

Column 8, line 11, claim 6;
    "at least" should be -- at at least --;

UNITED STATES PATENT AND TRADEMARK OFFICE
CERTIFICATE OF CORRECTION

PATENT NO. : 5,121,948

DATED : June 16, 1992

INVENTOR(S) : Charles B. Anderson and Charles R. Kenrick

It is certified that error appears in the above-indentified patent and that said Letters Patent is hereby corrected as shown below:

Column 8, line 16, claim 6;
    "at least" should be -- at at least --.

Signed and Sealed this

Twelfth Day of October, 1993

Attest:

BRUCE LEHMAN

*Attesting Officer*     Commissioner of Patents and Trademarks

REEXAMINATION CERTIFICATE (3041st)

United States Patent [19]
Anderson et al.

[11] B1 5,121,948
[45] Certificate Issued Oct. 29, 1996

[54] DRYER DUCT AND VENT ASSEMBLY INCLUDING A FLEXIBLE DUCT PORTIONS

[75] Inventors: Charles B. Anderson, Jacksonville, Tex.; Charles R. Kenrick, Spring Lake, Mich.

[73] Assignee: Builder's Pride, Inc., Fort Worth, Tex.

Reexamination Request:
No. 90/004,008, Oct. 23, 1995

Reexamination Certificate for:
Patent No.: 5,121,948
Issued: Jun. 16, 1992
Appl. No.: 621,757
Filed: Dec. 4, 1990

Certificate of Correction issued Oct. 12, 1993.

[51] Int. Cl.$^6$ ............... F16L 27/00; F24F 13/00
[52] U.S. Cl. ............... 285/168; 285/169; 285/181; 285/183; 285/278; 285/903; 285/165; 285/226; 34/235; 454/903
[58] Field of Search ............... 454/903; 34/235, 34/82, 86; 138/121; 285/168, 181, 183, 278, 903, 252, 253, 165, 169, 226

[56] References Cited

U.S. PATENT DOCUMENTS

| | | | |
|---|---|---|---|
| 910,119 | 1/1909 | Dunn | 283/183 |
| 997,072 | 7/1911 | Mares | 285/183 |
| 2,348,455 | 5/1944 | Daudelin | 454/903 |
| 2,482,558 | 9/1949 | Scaringella | 285/183 |
| 5,199,190 | 4/1993 | Mayer et al. | 34/235 |

FOREIGN PATENT DOCUMENTS

| | | | |
|---|---|---|---|
| 1403744 | 8/1975 | United Kingdom | 285/183 |

OTHER PUBLICATIONS

"The Do's and Don'ts of Installing a Dryer Vent Yourself"; 2 pages; Published by NEMCO.
"Dryer Mate"; Copy of Box for Selling Dryer Vent Elbows; 2 pages.
Videotape entitled *Plumbing* from the "Hands–On Series" produced by Do It Yourself, Inc., Copyrighted 1985.
Price sheet from Lambro Industries, Inc., dated Oct. 1, 1986.
P. 24 of the Apr. 1988 issue of *Home Mechanix*.

*Primary Examiner*—Eric K. Nicholson

[57] ABSTRACT

Disclosed is a metal dryer exhaust duct assembly using a pair of flexible corrugated metal ducts capable of linear extension and capable of reorientation of the duct ends, a pair of elbow connectors, one for attachment to a dryer exhaust outlet and the other for attachment to a wall inlet. Each duct has a swivel connection to its respective elbow connector, using a sleeve which interfits with the elbow connector by a peripheral projection and recess arrangement. Each duct can also be interfit with another such duct. The two ducts can be attached respectively to an dryer and a wall spaced from each other, and are vertically self supporting, whereby when the dryer is moved adjacent the wall, a person can readily telescopically interconnect the ends of the ducts over the top of the dryer. One or more pieces of the duct may be used to span the distance between the dryer and the wall outlet.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

Claims 6 and 7 are cancelled.

New claims 8 and 9 are added and determined to be patentable.

*8. A metal dryer exhaust duct assembly capable of completing assembly thereof between a dryer discharge pipe at the back of a dryer, and a wall outlet behind the dryer, by a person leaning over the dryer, comprising:*

- *first and second elbow connectors, each comprising a first sleeve defining a first opening to fit with a dryer discharge pipe and a wall outlet opening respectively, and a second sleeve defining a second opening for attachment to a flexible duct;*
- *a first flexible metal duct having one end attached to said second sleeve of said first connector;*
- *a second flexible metal duct having one end attached to said second sleeve of said second connector;*
- *said flexible ducts being of thin corrugated metal having a self supporting characteristic capable of linear extension and capable of lateral reorientation to orient said duct second ends in desired directions; and*
- *said first and second ducts both having second ends telescopically interfittable with each other to complete a flow path through the ducts, whereby a worker leaning over the dryer can connect the assembly by orienting said second ends toward each other and sliding these second ends telescopically together.*

*9. A metal dryer exhaust duct assembly capable of completing assembly thereof between a dryer discharge pipe at the back of a dryer, and a wall outlet behind the dryer, by a person leaning over the dryer, comprising:*

- *first and second elbow connectors, each comprising a first sleeve defining a first opening to fit with a dryer discharge pipe and a wall outlet opening respectively, and a second sleeve defining a second opening for attachment to a flexible duct;*
- *a first flexible metal duct having one end attached to said second sleeve of said first connector;*
- *a second flexible metal duct having one end attached to said second sleeve of said second connector;*
- *said flexible ducts being of thin corrugated metal having a self supporting characteristic capable of linear extension and capable of lateral reorientation to orient said duct second ends in desired directions;*
- *said first and second ducts both having second ends telescopically interfittable with each other to complete a flow path through the ducts;*
- *each said connector comprising an elbow having a swivel connection to its respective flexible duct, to thereby enable the dryer to be moved without disassembly of said duct assembly; and whereby a worker leaning over the dryer can connect the assembly by orienting said second ends toward each other and sliding these second ends telescopically together.*

\* \* \* \* \*